United States Patent
Abadi et al.

(10) Patent No.: US 11,880,470 B2
(45) Date of Patent: Jan. 23, 2024

(54) SYSTEM AND METHOD FOR VULNERABILITY DETECTION IN COMPUTER CODE

(71) Applicant: WHITESOURCE LTD., Givatayim (IL)

(72) Inventors: Aharon Abadi, Givatayim (IL); Bar Makovitzki, Givatayim (IL); Ron Shemer, Givatayim (IL)

(73) Assignee: WHITESOURCE LTD., Givatayim (IL)

( * ) Notice: Subject to any disclaimer, the term of this patent is extended or adjusted under 35 U.S.C. 154(b) by 262 days.

(21) Appl. No.: 17/493,316

(22) Filed: Oct. 4, 2021

(65) Prior Publication Data

US 2023/0107164 A1   Apr. 6, 2023

(51) Int. Cl.
G06F 21/57   (2013.01)
G06F 8/75   (2018.01)

(52) U.S. Cl.
CPC .............. *G06F 21/577* (2013.01); *G06F 8/75* (2013.01); *G06F 2221/033* (2013.01)

(58) Field of Classification Search
CPC ..... G06F 21/577; G06F 8/75; G06F 2221/033
See application file for complete search history.

(56) References Cited

U.S. PATENT DOCUMENTS

| | | | |
|---|---|---|---|
| 9,465,942 B1 * | 10/2016 | Kane-Parry | G06F 21/125 |
| 11,568,130 B1 * | 1/2023 | Gaucher | G06F 40/186 |
| 11,604,626 B1 * | 3/2023 | Sawant | G06F 8/75 |
| 2014/0208430 A1 * | 7/2014 | Guarnieri | G06F 21/52 726/25 |
| 2019/0042232 A1 * | 2/2019 | Trika | G06F 9/5055 |
| 2020/0019388 A1 * | 1/2020 | Jaeger | G06F 8/4441 |
| 2020/0220894 A1 * | 7/2020 | Liu | G06F 21/577 |
| 2023/0088304 A1 * | 3/2023 | Shemesh | G06F 21/57 726/22 |
| 2023/0107164 A1 * | 4/2023 | Abadi | G06F 21/577 726/25 |
| 2023/0195435 A1 * | 6/2023 | Jaeger | G06F 8/427 717/143 |

FOREIGN PATENT DOCUMENTS

| | | | | |
|---|---|---|---|---|
| CN | 110197072 A | * | 9/2019 | .......... G06F 11/3604 |
| EP | 2525301 A1 | * | 11/2012 | .......... G06F 21/125 |

* cited by examiner

*Primary Examiner* — Meng Li
(74) *Attorney, Agent, or Firm* — The Roy Gross Law Firm, LLC; Roy Gross

(57) ABSTRACT

A method, computerized apparatus and computer program product, the method comprising: obtaining user code; obtaining an indication of at least one vulnerability, the vulnerability associated with one or more sets comprising at least a first instruction type and a second instruction type; scanning the code using dependency analysis, to obtain for one set: one or more first instructions of the first instruction type, one or more second instructions of the second instruction type, and further instructions associated with entities relevant to the first instruction and the second instruction; eliminating instructions other than the first instruction, the second instruction and one of the further instructions, thereby obtaining a collection of instructions that behaves differently from the user code; and providing the collection of instructions for vulnerability detection.

18 Claims, 4 Drawing Sheets

SYSTEM AND METHOD FOR VULNERABILITY DETECTION IN COMPUTER CODE

TECHNICAL FIELD

Figure 1:
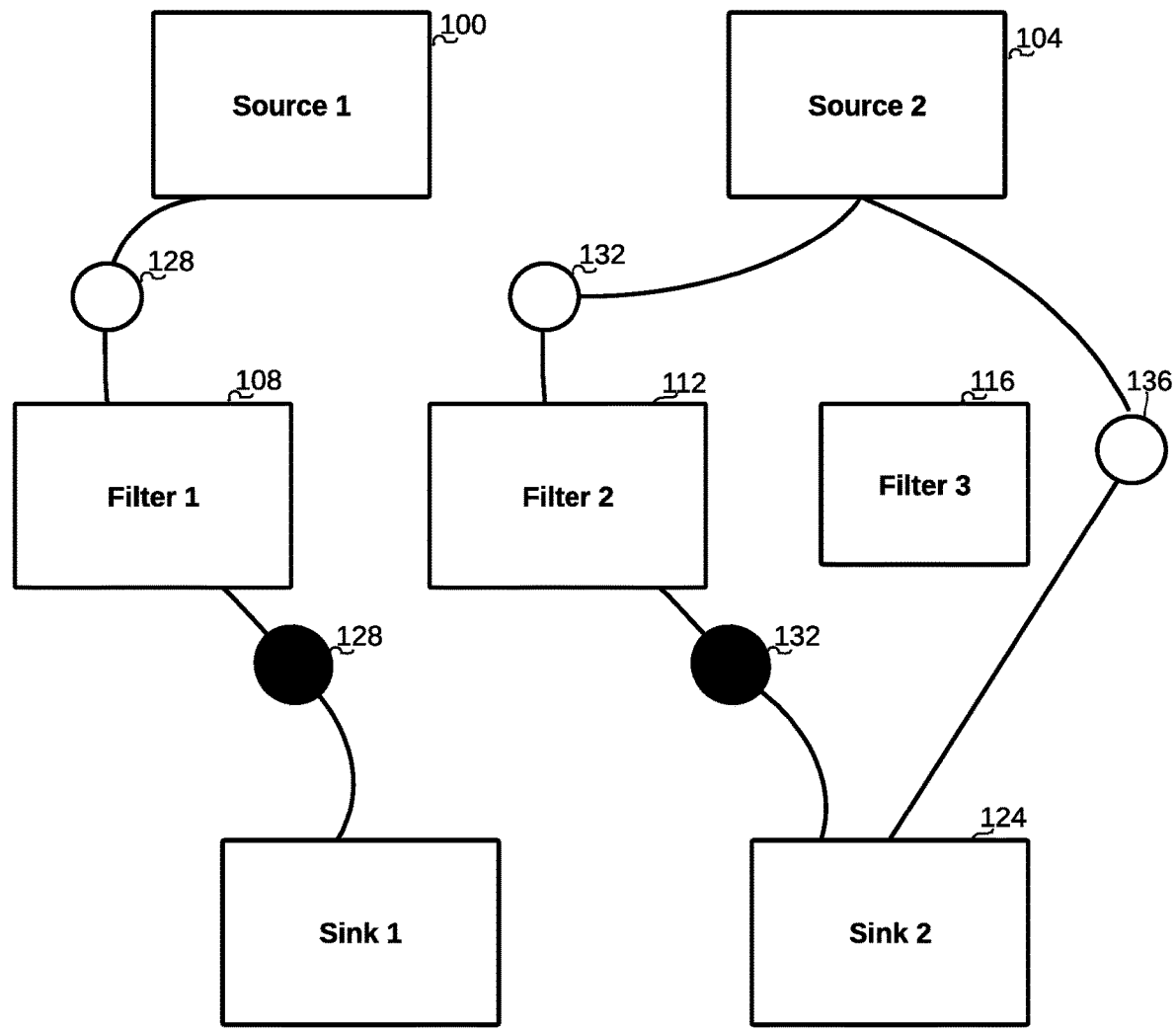

The present disclosure relates to detecting vulnerabilities in computer code in general, and to a system and method for static analysis for detecting various vulnerability types, in particular.

BACKGROUND

Software vulnerabilities are a major cause of a variety of problems, including security problems, privacy violations, financial risks, or any other trouble ranging between mere inconvenience and critical interests including life and death. In particular, security vulnerabilities open a gate to computer hacks, which may cause tremendous damage to the computers and/or to users and clients of the computer systems. By taking advantage of design or implementation flaws, malicious attackers are able to gain access to confidential information available to the target program, take control of the data and use it in a problematic manner. A straight forward example relates to a buffer overflow which can be exploited by attackers to manipulate the software input, overwrite the stack and thus gain control over areas of the code and affect execution of the program.

Some methodologies exist for detecting vulnerabilities, wherein one important distinction is between static and dynamic methods.

Static program analysis is the analysis of computer software performed without executing the program. Static analysis may refer to the source code or to the object code. Static program analysis sometime use software metrics and reverse engineering.

Dynamic analysis, in contrast, may be performed on programs while they are executing. This inherently implies that vulnerabilities discovery is limited by the coverage of the program, may require a large number of scenarios to be run, but even that cannot guarantee that all vulnerabilities have been discovered.

Yet, with both approaches, debugging code to discover vulnerabilities is a hard task, both in existing code or in code that is under development. Detecting all possible vulnerabilities and their causes is an everlasting struggle, inter alia, since the cause and effect of such vulnerabilities may be tens to thousands or even millions of code instructions apart. For example, a variable may be used millions of instructions after it has been read from a user, a file, or the like.

BRIEF SUMMARY

One exemplary embodiment of the disclosed subject matter is a computer-implemented method comprising: obtaining user code; obtaining an indication of one or more vulnerabilities, each vulnerability associated with one or more sets comprising at least a first instruction type and a second instruction type; scanning the code using dependency analysis, to obtain for one of the sets set: one or more first instructions of the first instruction type, one or more second instructions of the second instruction type, and further instructions associated with entities relevant to the first instruction and the second instruction; eliminating instructions other than the first instruction, the second instruction and one of the further instructions, thereby obtaining a collection of instructions that behaves differently from the user code; and providing the collection of instructions for vulnerability detection. The method can further comprise reporting findings of the vulnerability detection to the user. Within the method, the findings of the vulnerability detection are optionally presented to a user by indicating the remaining instructions on the user's code in a different manner than the removed instructions. Within the method, the collection of instructions when compiled and executed optionally provides a result which is different from the user code when compiled and executed. Within the method, the collection of instructions optionally does not provide results when compiled and executed. Within the method, the collection of instructions optionally does not compile. Within the method, the context is optionally associated with a vulnerability of taint flow analysis type. Within the method, the first instruction type is optionally a source and the second instruction type is optionally a sink. Within the method, a vulnerability is optionally detected if the user code comprises no sanitizer instruction between the source and the sink. Within the method, scanning the code optionally comprises: identifying a sink within the user code; forward scanning the user code from the sink and eliminating at least one instruction not dependent upon the sink; backward scanning the user code from the sink to detect at least one source, leaving only instructions on which the sink is dependent. The method can further comprise forward scanning the user code from the source and eliminating at least one instruction not affecting a variable associated with the source. Within the method, optionally at least one instruction eliminated by one or more scanning and maintained by one or more other scanning is eliminated. Within the method, at least one instruction optionally eliminated by one or more forward scanning and maintained by one or more other scanning is maintained. The method can further comprise replacing function calls with inline instructions. The method can further comprise at least one of: forward scanning the user code from the sink and eliminating at least one instruction not dependent upon the sink, and backward scanning the user code from the source and eliminating at least one instruction which the source does not depend upon. Within the method, the dependency is optionally control dependency or data dependency.

Another exemplary embodiment of the disclosed subject matter is a computerized apparatus having a processor, the processor being adapted to perform the steps of: obtaining user code; obtaining an indication of one or more vulnerabilities, each vulnerability associated with one or more sets comprising at least a first instruction type and a second instruction type; scanning the code using dependency analysis, to obtain for one of the sets set: one or more first instructions of the first instruction type, one or more second instructions of the second instruction type, and further instructions associated with entities relevant to the first instruction and the second instruction; eliminating instructions other than the first instruction, the second instruction and one of the further instructions, thereby obtaining a collection of instructions that behaves differently from the user code; and providing the collection of instructions for vulnerability detection. Within the apparatus, the collection of instructions optionally does not compile, or does not provide results when compiled and executed, or when compiled and executed provides a different result from the user code when compiled and executed. Within the apparatus, the first instruction type is optionally a source and the second instruction type is optionally a sink, and wherein a vulnerability is optionally detected if the user code comprises no sanitizer instruction between the source and the sink.

Yet another exemplary embodiment of the disclosed subject matter is a computer program product comprising a computer readable storage medium retaining program instructions, which program instructions when read by a processor, cause the processor to perform a method comprising: obtaining user code; obtaining an indication of one or more vulnerabilities, each vulnerability associated with one or more sets comprising at least a first instruction type and a second instruction type; scanning the code using dependency analysis, to obtain for one of the sets set: one or more first instructions of the first instruction type, one or more second instructions of the second instruction type, and further instructions associated with entities relevant to the first instruction and the second instruction; eliminating instructions other than the first instruction, the second instruction and one of the further instructions, thereby obtaining a collection of instructions that behaves differently from the user code; and providing the collection of instructions for vulnerability detection.

THE BRIEF DESCRIPTION OF THE SEVERAL VIEWS OF THE DRAWINGS

Figure 2:
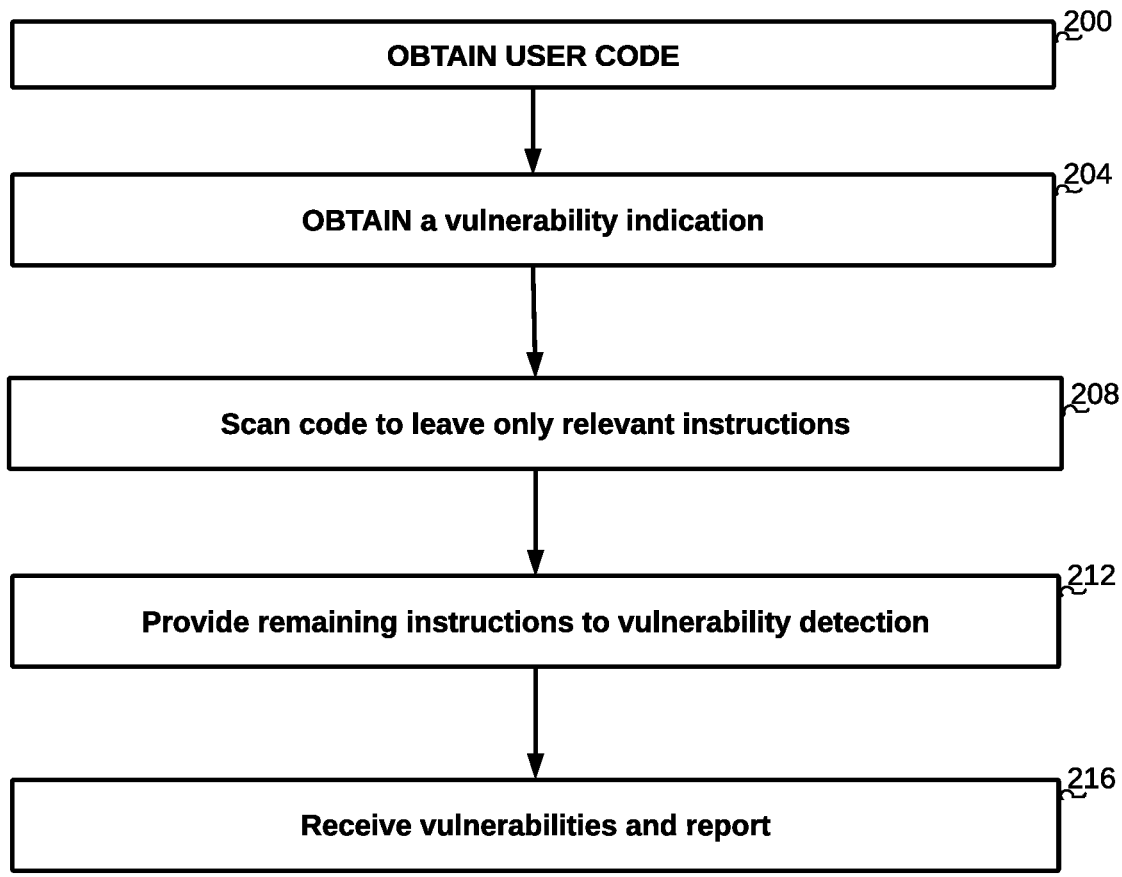
Figure 3:
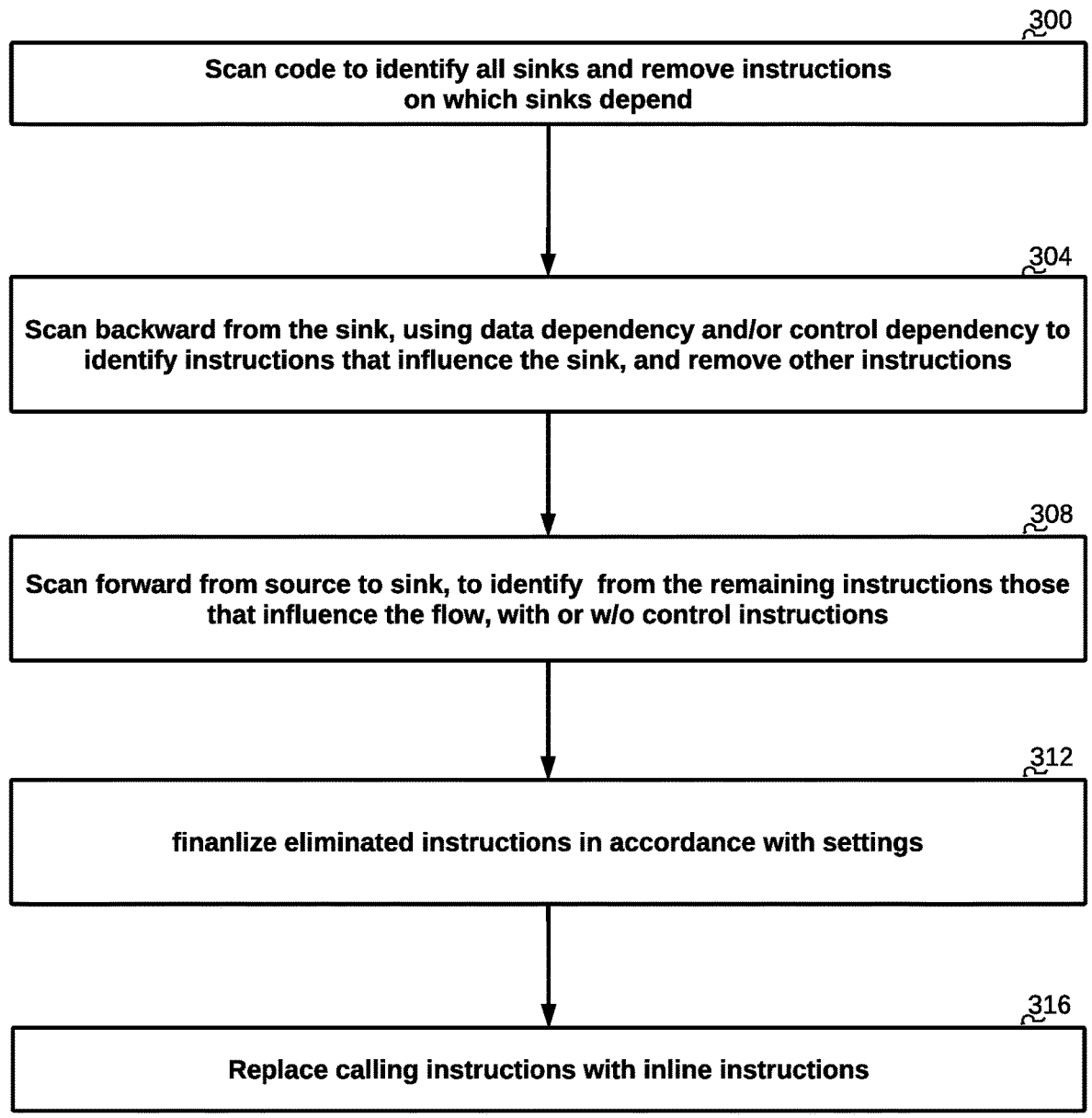
Figure 4:
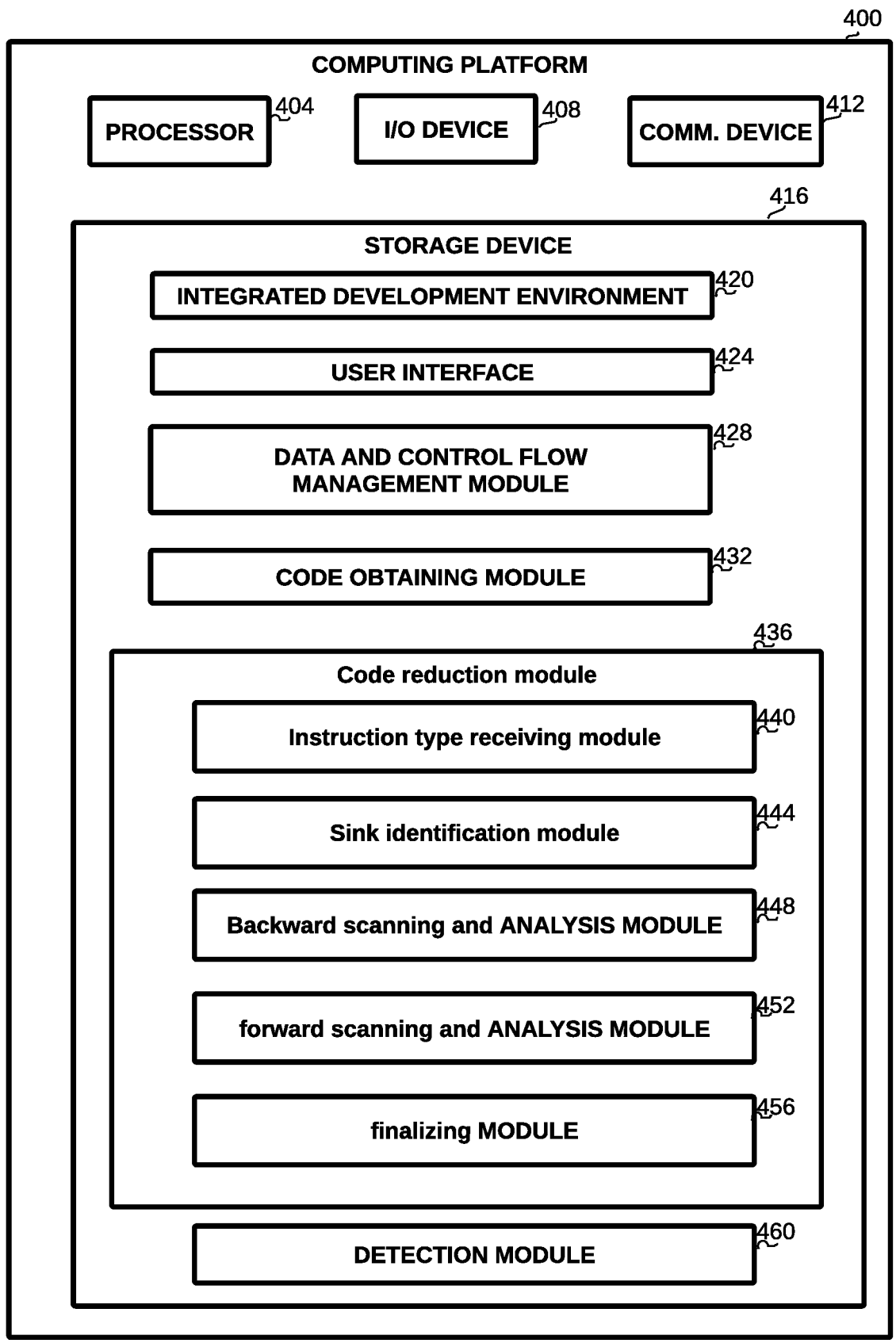

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a listing of pseudo-code, demonstrating a security vulnerability, in accordance with some exemplary embodiments of the subject matter;

FIG. 2 shows a flowchart of steps in a method for eliminating a vulnerability in source code, in accordance with some exemplary embodiments of the subject matter; and FIG. 3 shows a flowchart of steps in a method for reducing code to contain only instructions relevant for taint flow vulnerabilities; and FIG. 4 is a block diagram of a system for detecting vulnerabilities in source code, in accordance with some exemplary embodiments of the subject matter.

DETAILED DESCRIPTION

One technical problem dealt with by the disclosed subject matter relates to discovering vulnerabilities in software code. The problem becomes harder as the software becomes larger. For example, the breech and where the problem is caused may be thousands or millions of code instructions apart, and the manifestation of the problem may seem unrelated to any of them.

A human trying to analyze such code and discover vulnerabilities cannot possibly thoroughly analyze such long stretches of code, and may miss many such vulnerabilities. An automated process, however, may try to analyze the possible flows and may thus introduce too many false positives which will not enable to focus on the real problems.

Another technical problem relates to the need to discover problems regardless of the code reachability and testing coverage, and independently of the collection of executions practically performed.

Yet another technical problem relates to discovering security vulnerabilities, and in particular vulnerabilities detectable by taint flow analysis, such as injection vulnerabilities. Taint flow analysis is an accepted approach to detect malicious behavior in recent years. Based on the concept that some data, for example data received from a user, is not trustworthy, taint analysis attempts to keep track of the data and monitor suspicious actions.

Each such vulnerability may be represented as a sequence of source and a sink. A source may be a location in the code in which input is provided from a user, from a file, over a communication channel, or the like. A sink is a code area in which the input is used and may cause damage, for example printed, used as a query to a database, used as a shell command, or the like.

A combination of source and sink may thus be hazardous unless a sanitizer, also referred to as a filter, is present therebetween. A sanitizer is a code segment that verifies the input and ensures its integrity, and thus needs to be located such that the participating entities are not affected after being sanitized and before being used by the sink.

Each taint flow vulnerability may thus be expressed as a triplet of <source, sanitizer, sink>. It will be appreciated that each sink may be associated with a plurality of sources and/or plurality of sanitizers.

For example, a source may be a code line intended to receive a name from a user, and a sink may be an SQL command using the name. MS SQL has a built in function that enables shell command execution. An exemplary query may be of the form:
 1. select item, price from product where item_category='$user_input' order by price Where $user_input is provided by a user or read form a file. If the source, i.e. the provided string is:
 2. '; exec master...xp_cmdshell 'dir'-- then the query will take the form of:
 3. select item, price from product where item_category='';
   exec master...xp_cmdshell 'dir'--' order by price and can be broken down into:
 1. a first SQL query: select item, price from product where item_category='';
 2. a second SQL query, which executes the dir command in the shell:
   exec master...xp_cmdshell 'dir'
 3. an MS SQL comment: --' order by price The malicious input thus changes the semantics of the query into: a query, a shell command execution and a comment, wherein the shell command can cause a significant damage. In the current example, the 'dir' command can expose undesired contents. The presence of a sanitizer, checking for example that the provided string does not contain a single quote (') or another undesired character between the input and the query, could have prevented this vulnerability.

However, currently known solutions have failed to satisfactorily detect such malicious behavior.

One technical solution of the disclosure comprises identifying within the code known combinations of instruction types associated with the relevant vulnerability type. All other code instructions, which may amount to thousands or millions of instructions, may be eliminated, also referred to as removed, thus leaving only a short code segment, which may be easily scanned for problems by a human or by a detection software, thus crystalizing the relevant vulnerability.

The discussion below relates to code slices, e.g., a tested unit such as a function, method, or the like, optionally comprising also code called from the tested unit, if such code is available.

Another technical solution of the disclosure relates to removing significant parts of the code, such that the remaining instructions may not amount to a tested unit that behaves the same as the original unit, and may not be executable or even compilable. Eliminating the requirement of a code segment that compiles, executes, and behaves the same as the original code enables to significantly reduce the size such that the resulting code may be easily checked for vulnerabilities by a human or a computerized process.

Yet another technical solution of the disclosure relates to reducing the code in order to detect security vulnerabilities, and in particular security vulnerabilities of the taint coder type, comprised of a <source, sanitizer, sink> triplet.

In the description below the term "dependency" may relate to "data dependency" or to "control dependency". "Data dependency" is to be broadly construed to cover any situation in which instruction a modifies a variable used by instruction b that is executed after a, thus making b data-dependent on a. The term "control dependency" relates to a situation in which instruction a modifies whether instruction b that may be executed after a is indeed executed, thus making b control-dependent on a. The term "b is executed after a" may not necessarily mean "immediately after", rather intervening commands may be executed between the executions of a and b. It will be appreciated that other types of dependency may be defined and used, for example variables or function calls may depend on the definitions of the variables or functions. Dependency may be defined as intra-function or inter-function.

In the description below the terms "scanning forward" or "scanning backward" from a computer instruction is to be broadly construed to cover any instruction that may be called after or before the instruction, respectively, in accordance with the dependency as defined above, whether in the same code section, or in other code sections called from or called by instructions from the same code section.

The code may be processed as follows:

A code slice, for example a function, a method, or the like may be scanned for sinks. Optionally scanning forward from the sinks, one or more instructions may be eliminated, since they cannot affect the sink anymore. However, some instructions may be left, for example instructions that are not eliminated in respect of one or more sinks may be left.

Starting from each sink and working backwards, all sources may be identified. Optionally scanning backwards from the source, one or more instructions may be eliminated. However, some instructions may be left, for example instructions that are not eliminated in respect of one or more sources may be left.

Optionally Starting from each sink and working backwards within the code slice: instructions excluding those upon which the sink and the sink-related variables depend, may be eliminated. Working backwards may relate to moving to preceding instructions in accordance with the dependency defined above, including to one or more instructions that call the current function or method. For example, if function f( ) is called from function g( ) and also from function h( ), proceeding backwards may relate to the calling instruction in g( ) and in h( ). The instructions that are not eliminated may include those that have data-dependency and/or control-dependency over the current instruction Then, starting from the source and working forward, instructions on which the source variables do not depend, may be eliminated. The affecting instructions may include data-dependency instructions, control-dependency instructions, or other dependency instructions.

In some embodiments, only code instructions that are in the conjunction of the instructions eliminated by checking dependency backward from the sink, and instructions eliminated by checking dependency forward from the source, are eliminated. In other situations, depending for example on the resources, the size of the code or other factors, code instructions left by one of checking dependency backward from the sink, and checking dependency forward from the source, may also be eliminated. The decision which instructions to leave and which to eliminate may depend, for example, on one or more settings indicating the preferred balance between the levels of false positives, i.e., a false vulnerability alert, and false negatives, i.e., a missed vulnerability.

One technical effect of the disclosure is the crystallization of an original code unit into a significantly smaller code unit that contains the same possible vulnerabilities as the original code unit, wherein the smaller code unit is easier to inspect and detect the vulnerabilities, whether by a human inspector or by a program.

Another technical effect of the disclosure is that the code reduction is static, and thus does not rely on the coverage of various tests or on specific inputs provided to the program in runtime.

Yet another technical effect of the disclosure is that the resulting code is not required to behave in the same way as the original code, or even to be executable or compilable. Thus, further reductions can be performed relative to other methods that require the reduced code to behave in the same manner as the original code, or at least to compile and be executable.

Referring now to FIG. 1, demonstrating a situation of security vulnerability, and to the pseudo-code shown in Listing 1 below.

| Listing 1 |
|---|
| instructions |
| Source 1 |
| <instructions> |
| <instructions> |
| Source 2 |
| <instructions> |
| <instructions> |
| Filter 1 |
| <instructions> |
| Filter 2 |
| <instructions> |
| Filter 3 |
| <instructions> |
| Sink 1 |
| <instructions> |
| Sink 2 |
| <instructions> |

Each row in Listing 1 may represent zero, one or more, for example tens, hundreds, thousands, millions or more instructions, including data instructions, control instructions, or others, which may amount to millions of instructions.

A variable 128, 132 or 136 may be set or influenced by source instruction 1 (100) or source instruction 2 (104), may or may not be filtered, sanitized or otherwise checked by Filter instruction 1 (108), Filter instruction 2 (112) or Filter instruction 3 (116), and used by sink instruction 1 (120) or sink instruction 2 (124).

If the variable, such as variable 1 (128) or variable 2 (132) passes through a filter, such as Filter instruction 1 (108) or Filter instruction 2 (112), and is not further affected before reaching the corresponding sink, then the filter instruction sanitizes the variable and makes sure that it is safe to use it in sink instruction 1 (120) or sink instruction 2 (124). If, however, the variable does not pass through a sanitizer, such as variable 136, then its usage in a sink, such as sink 2 (124) may pose a security vulnerability.

Referring now to FIG. 2, showing a flowchart of steps in a method for eliminating a vulnerability in source code, in accordance with some exemplary embodiments of the subject matter.

On step 200, user code may be obtained. The method may be implemented by a stand-alone system, as a service, or as part of an Integrated Development Environment (IDE) implemented for example as a plug-in, as a web service, or the like. Thus, the code may be obtained from within the IDE, from a storage device, received over a communication channel, or the like.

On step 204, an indication to at least one vulnerability to be checked may be obtained, for example from a user asking to check vulnerabilities of a certain type, such as security vulnerability, privacy vulnerability, or the like. The vulnerability may consist of, or comprise one or more sets of the instruction type combinations to be detected. For example, in the taint flow analysis, each set may comprise a <source, filter, sink> instruction combination. Specifically, in the injection-type vulnerabilities, commands that activate a query, such as execute, executeQuery, addBatch, or the like may be indicated as sinks, and commands that read data from a user, a file or a communication channel may be indicated as sources. The instructions that are associated with each type may be read from a file, retrieved from a database, received from a service, or obtained in any other manner.

On step 208, the code may be scanned to remove instructions that are irrelevant to the vulnerability, and leave only the relevant instructions, such that a user or a computerized process may detect vulnerabilities within the remaining code. Scanning may thus obtain for one or more sets associated with the vulnerability: at least a first instruction of a first instruction type, at least a second instruction of a second instruction type, and further instructions associated with entities such as variables, relevant to the first instruction and the second instruction. Scanning the code may include dependency analysis. An implementation of code reduction step 208 is exemplified in FIG. 3 below for the specific vulnerability of taint flow.

On step 212, the resulting code, which may comprise a small fraction of the original code may be provided to a vulnerability detection process, whether performed by a human or by a computer program.

On step 216 the detected or suspected vulnerabilities may be received and provided to a user. For example, the vulnerabilities may be provided as a file comprising a reduced listing of instructions. In further embodiments, the remaining instructions, which demonstrate the vulnerability, including the source, sink and intermediate instructions may be marked upon the relevant files displayed within the IDE, for example using a font, color, size or another characteristic different than the other instructions, such that the user can review the remaining instructions in their context.

Referring now to FIG. 3, showing a flowchart of steps in a method for reducing code to contain only instructions relevant for taint flow vulnerabilities.

On step 300, the code may be scanned to identify all sinks within the tested unit, and to optionally eliminate instructions following each sink. In some embodiments, the eliminated instructions are those that which do not depend on the sink.

Referring now to Listing 2 below, a sink instruction is located in line 9 inside function g( ), thus line 10 (instructions 2) following this instruction may be eliminated.

| Listing 2 | |
|---|---|
| 1. | h( ){ |
| 2. | x = getInput( ); |
| 3. | q = exp; |
| 4. | if (q) |
| 5. | g(x) |
| 6. | < instructions 1 > |
| 7. | } |
| 8. | g(x){ |
| 9. | sink(x) |
| 10. | < instructions 2> |
| 11. | } |

On step 304, the code may be scanned backward from the sink, using control dependency and/or data dependency, to identify all the instructions that influence whether and how the sink instruction is performed.

Thus, in Listing 2 above, the sink is in line 9. Line 9 depends on line 8 (g(x){ ), line 6 (<instructions 1>) is irrelevant to the sink and may thus be eliminated, line 8 depends on line 5 (the call to g(x)) and thus line 5 is maintained, line 4 (if(q)) has control-dependency to the sink and is thus maintained, line 3 (q=exp) has no dependency to the sink, but has data dependency to maintained line 4 (if(q)), and may thus be eliminated or maintained, depending, for example on the settings. Line 2 (x=getInput( )) is a source and is thus maintained. Since there are no more sources, the process may stop and the resulting code may be as shown in Listing 3 below:

| Listing 3: | |
|---|---|
| 1. | h( ){ |
| 2. | x = getInput( ); |
| 3. | q = exp; |
| 4. | if(q) |
| 5. | g(x) |
| 6. | } |
| 7. | g(x){ |
| 8. | sink(x) |
| 9. | } |

On step 308, the code may be scanned from the source forward, using dependencies as defined above, to identify all the instructions that influence the variables received from the source. Consider the code shown on Listing 4 below, as may have been received from original code after step 304 above and Line 3 (A a=new A( )) has been maintained by step 304 since a is used in line 6 (g(x,a)).

| Listing 4 | |
|---|---|
| 1. | h( ){ |
| 2. | x = getInput( ); |
| 3. | x=filter(x); |
| 4. | A a = new A( ); |
| 5. | q = exp; |
| 6. | if (q) |

| Listing 4 | |
|---|---|
| 7. | g(x,a) |
| 8. | } |
| 9. | g(x,a){ |
| 10. | sink(x,a) |
| 11. | } |

Thus, on step 308, the code is scanned forward from the source on line 2 (x=getInput( ). Line 3 (x=filter (x)) is maintained since it affects the variable associated with the source. Line 4 (A a=new AO) and line 5 (q=exp) may be removed, since neither affects variable x associated with a source. The resulting code is as shown in Listing 5 below

| Listing 5 | |
|---|---|
| 1. | h( ){ |
| 2. | x = getInput( ); |
| 3. | x=filter(x); |
| 4. | g(x,a) |
| 5. | } |
| 6. | g(x,a){ |
| 7. | sink(x,a) |
| 8. | } |

On step 312 the eliminated instructions may be finalized in accordance with the settings. For example, instructions eliminated on one or more of the passes but maintained by one or more other passes, may be eliminated or maintained in accordance with the settings, the acceptable false positive rate vs. the acceptable false negative rate, available computing resources, or the like. The decision whether to eliminate or maintain instructions may also depend on the types of pass(es) that eliminated or removed the instructions, or on other parameters.

On step 316, the call to functions may be replaced with the remaining instructions from the functions, i.e., placed online. It will be appreciated that this step may be omitted if it is preferred to maintain the calling structure of the code. If this step is performed, line 4 (g(x,a)) may be replace with line 7 (sink(x,a)), to obtain the code shown on Listing 6 below.

| Listing 6 | |
|---|---|
| 1. | h( ){ |
| 2. | x = getInput( ); |
| 3. | x=filter(x); |
| 4. | sink(x,a) |
| 5. | } |

Thus, Listing 5 or Listing 6 are shorter and crystalized versions of Listing 4. It will be appreciated that any of the removed lines may represent a large portion of code, possibly comprising tens, hundreds, thousands or millions of code instructions, therefore their removal may shorten the code into a fraction of its original size, thus enabling to easily spot the vulnerabilities. strengthen Referring now to FIG. 4, showing a block diagram of a system for detecting vulnerabilities in source code, in accordance with some exemplary embodiments of the subject matter.

The system may comprise one or more computing platforms 400, which may be for example a computing platform used by a developer. The system may be implemented as a stand-alone system, or as a system executing an Integrated Development Environment (IDE), comprising one or more plug-ins, or accessing web services providing services to one or more clients, or the like.

In some exemplary embodiments of the disclosed subject matter, computing platform 400 can comprise processor 404. Processor 404 may be any one or more processors such as a Central Processing Unit (CPU), a microprocessor, an electronic circuit, an Integrated Circuit (IC) or the like. Processor 404 may be utilized to perform computations required by the apparatus or any of it subcomponents.

In some exemplary embodiments of the disclosed subject matter, computing platform 300 can comprise an Input/Output (I/O) device 408 such as a display, a pointing device, a keyboard, a touch screen, or the like. I/O device 408 can be utilized to receive input from a user, such as settings to be employed during the code reduction, and to provide output to a user, such as showing the reduced code.

In some exemplary embodiments of the disclosed subject matter, computing platform 400 can comprise a communication device 412, for communicating with other computing platforms, for obtaining code, obtaining the specific instructions to be searched, for example sources and sinks, exporting the reduced code, or the like.

Computing platform 400 may comprise a storage device 416. Storage device 416 may be a hard disk drive, a Flash disk, a Random Access Memory (RAM), a memory chip, or the like. In some exemplary embodiments, storage device 416 can retain program code operative to cause processor 404 to perform acts associated with any of the subcomponents of computing platform 400.

Storage device 416 can store the modules detailed below. The modules may be arranged as one or more executable files, dynamic libraries, static libraries, methods, functions, services, or the like, programmed in any programming language and under any computing environment.

Storage device 416 may store an integrated development environment 420, also referred to as an IDE, designed for programming, compiling if required, executing and debugging program code. One or more of the modules below may be implemented as one or more components such as plug-ins for IDE 316, enabling vulnerability detection as part of the code development.

Storage device 416 may store user interface 424 for displaying to a user or receiving from the user various aspects associated with the disclosure, such as suggesting vulnerabilities to be checked and receiving the user's selection, receiving various parameters, displaying reduced code demonstrating vulnerabilities whether as a separate code or by indicating the remaining instructions on the user's code, or the like. User interface 424 may be implemented as part of IDE 420.

Storage device 416 can store data and control flow management module 428, for managing the control and data flow within the apparatus, such that modules are invoked at the correct order and with the required information. For example, data and control flow management module 428 can be configured to reduce the code and provide the reduced code to a detection module.

Storage device 416 can store code obtaining module 432 for obtaining computer code from a user. The code may be received in any manner, such as read from one or more files, retrieved through a communication channel, or the like. Code obtaining module 432 can also be part of IDE 420 which may provide access to the code.

Storage device 416 can store code reduction module 436, for reducing user's code.

Code reduction module 436 may comprise instruction type receiving module 440 for receiving instructions for each instruction type to be searched for, in accordance with the tested vulnerabilities. For example, for taint flow vulnerabilities, one or more instructions may be received as sink, and corresponding instructions may be received as sources or as filters for each such sink.

Code reduction module 436 may comprise sink identification module 444, for scanning the user's code and identifying one or more sink instructions therein.

Code reduction module 436 may comprise backward scanning and analysis module 448 for scanning the user's code backwards from the sink until the source, and eliminating instructions that the source is not control-dependent and/or data-dependent upon, according to a setting or configuration.

Code reduction module 436 may comprise forward scanning and analysis module 452 for scanning the user's code forward from the source until the sink, and eliminating instructions that do not affect the variables associated with the source instruction.

Code reduction module 436 may comprise finalizing module 456 for determining which of the instructions eliminated by one or more of the passes, and optionally maintained by one or more other passes are to be maintained, and which are to be eliminated.

Storage device 416 can store detection module 460, for determining whether a sanitizer instruction is executed between each pair of corresponding source and sink, otherwise a vulnerability may be detected.

It is noted that the teachings of the presently disclosed subject matter are not bound by the computing platforms described with reference to FIG. 4 and the methods of FIG. 2 and FIG. 3. Equivalent and/or modified functionality can be consolidated or divided in another manner and can be implemented in any appropriate combination of software with firmware and/or hardware and executed on one or more suitable devices. The steps of FIG. 2 or FIG. 3 can also be divided or consolidated in a different manner.

The system can be a standalone entity, or integrated, fully or partly, with other entities, which can be directly connected thereto or via a network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, JavaScript, NodeJs, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   obtaining user code;
   obtaining an indication of at least one vulnerability, the vulnerability associated with at least one set comprising at least a first instruction type and a second instruction type, wherein the first instruction type is a source type and the second instruction type is a sink type;
   scanning the code using dependency analysis, to obtain for the at least one set:
      at least one first instruction of the first instruction type,
      at least one second instruction of the second instruction type, and
      further instructions associated with entities relevant to the first instruction and the second instruction,
   wherein scanning the code comprises:
      identifying a sink within the user code;
      forward scanning the user code from the sink and eliminating at least one instruction not dependent upon the sink; and
      backward scanning the user code from the sink to detect at least one source, leaving only instructions on which the sink is dependent;
   eliminating instructions other than the at least one first instruction, the at least one second instruction and at least one of the further instructions, thereby obtaining a collection of instructions that behaves differently from the user code; and
   providing the collection of instructions for vulnerability detection.

2. The method of claim 1, further comprising reporting findings of the vulnerability detection to the user.

3. The method of claim 2, wherein the findings of the vulnerability detection are presented to a user by indicating the remaining instructions on the user's code in a different manner than the removed instructions.

4. The method of claim 1, wherein the collection of instructions when compiled and executed provides a result which is different from the user code when compiled and executed.

5. The method of claim 1, wherein the collection of instructions does not provide results when compiled and executed.

6. The method of claim 1, wherein the collection of instructions does not compile.

7. The method of claim 1, wherein the context is associated with a vulnerability of taint flow analysis type.

8. The method of claim 1, wherein a vulnerability is detected in response to the user code comprising no sanitizer instruction between the source and the sink.

9. The method of claim 1 further comprising forward scanning the user code from the source and eliminating at least one instruction not affecting a variable associated with the source.

10. The method of claim 1 wherein at least one instruction eliminated by one or more scanning and maintained by one or more other scanning is eliminated.

11. The method of claim 1 wherein at least one instruction eliminated by one or more forward scanning and maintained by one or more other scanning is maintained.

12. The method of claim 1 further comprising replacing function calls with inline instructions.

13. The method of claim 1 further comprising at least one of: forward scanning the user code from the sink and eliminating at least one instruction not dependent upon the sink, and backward scanning the user code from the source and eliminating at least one instruction which the source does not depend upon.

14. The method of claim 1 wherein the dependency is at least one from control dependency and data dependency.

15. A computerized apparatus having a processor, the processor being configured to perform the steps of:
   obtaining user code;
   obtaining an indication of at least one vulnerability, the vulnerability associated with at least one set comprising at least a first instruction type and a second instruction type, wherein the first instruction type is a source type and the second instruction type is a sink type;
   scanning the code using dependency analysis, to obtain for the at least one set:
      at least one first instruction of the first instruction type,
      at least one second instruction of the second instruction type, and
      further instructions associated with entities relevant to the first instruction and the second instruction,.
   wherein scanning the code comprises:
      identifying a sink within the user code;
      forward scanning the user code from the sink and eliminating at least one instruction not dependent upon the sink; and
      backward scanning the user code from the sink to detect at least one source, leaving only instructions on which the sink is dependent;
   eliminating instructions other than the at least one first instruction, the at least one second instruction and at least one of the further instructions, thereby obtaining a collection of instructions that behaves differently from the user code; and providing the collection of instructions for vulnerability detection.

16. The apparatus of claim 15, wherein the collection of instructions does not compile, or does not provide results when compiled and executed, or when compiled and executed provides a different result from the user code when compiled and executed.

17. The apparatus of claim 15, wherein a vulnerability is detected subject to the user code comprising no sanitizer instruction between the source and the sink.

18. A computer program product comprising a non-transitory computer readable medium retaining program instructions, which instructions when read by a processor, cause the processor to perform:
    obtaining user code;
    obtaining an indication of at least one vulnerability, the vulnerability associated with at least one set comprising at least a first instruction type and a second instruction type, wherein the first instruction type is a source type and the second instruction type is a sink type;
    scanning the code using dependency analysis, to obtain for the at least one set:
        at least one first instruction of the first instruction type,
        at least one second instruction of the second instruction type, and
        further instructions associated with entities relevant to the first instruction and the second instruction,.
    wherein scanning the code comprises:
        identifying a sink within the user code;
        forward scanning the user code from the sink and eliminating at least one instruction not dependent upon the sink; and
        backward scanning the user code from the sink to detect at least one source, leaving only instructions on which the sink is dependent;
    eliminating instructions other than the at least one first instruction, the at least one second instruction and at least one of the further instructions, thereby obtaining a collection of instructions that behaves differently from the user code; and
    providing the collection of instructions for vulnerability detection.

\* \* \* \* \*